United States Patent

Manning et al.

Patent Number: 6,157,846
Date of Patent: Dec. 5, 2000

[54] METHOD OF AND APPARATUS FOR PROVIDING AN INTERFACE BETWEEN AN ANALOG FACSIMILE DEVICE AND A WIRELESS NETWORK

[75] Inventors: Serge Manning, Plano; Peter W. Wenzel, Dallas; Cecil L. Taylor, Plano; David J. Lauson, Allen, all of Tex.

[73] Assignee: Nortel Networks Limited, Montreal, Canada

[21] Appl. No.: 08/941,818

[22] Filed: Oct. 1, 1997

Related U.S. Application Data

[60] Provisional application No. 60/049,846, Jun. 17, 1997.

[51] Int. Cl.[7] ..................................................... H04Q 7/20
[52] U.S. Cl. ........................ 455/557; 455/414; 379/93.01
[58] Field of Search .................................. 455/557, 556, 455/414; 358/442, 434, 407; 379/58, 93.01, 93.05, 93.08, 100.01, 100.08, 100.09, 100.12, 100.13, 100.17

[56] References Cited

U.S. PATENT DOCUMENTS

| | | | |
|---|---|---|---|
| 4,977,609 | 12/1990 | McClure | 455/557 |
| 5,166,977 | 11/1992 | Ross | 379/100 |
| 5,263,078 | 11/1993 | Wilson et al. | 379/58 |
| 5,369,501 | 11/1994 | Wilson et al. | 358/407 |
| 5,420,692 | 5/1995 | Lin et al. | 358/426 |
| 5,561,703 | 10/1996 | Arledge et al. | 455/557 |
| 5,568,536 | 10/1996 | Tiller et al. | 455/557 |
| 5,752,199 | 5/1998 | Scott | 455/557 |
| 5,884,191 | 3/1999 | Karpus et al. | 455/557 |
| 5,894,595 | 4/1999 | Foladare et al. | 455/414 |

FOREIGN PATENT DOCUMENTS

| | | |
|---|---|---|
| 2 308 523 | 6/1997 | United Kingdom . |
| WO 94 15433 | 7/1994 | WIPO . |
| WO 95 03667 | 2/1995 | WIPO . |
| WO 97 23087 | 6/1997 | WIPO . |

*Primary Examiner*—Edward F. Urban
*Assistant Examiner*—Tilahun Gesesse
*Attorney, Agent, or Firm*—John D. Crane

[57] ABSTRACT

An interface device for faxing documents over a wireless network includes circuitry for emulating the public switched telephone network (PSTN) for communicating with an analog fax machine. The circuitry receives and stores a document image from the fax machine. It then prompts a wireless transceiver to establish a call connection. Once a call connection is created to a destination fax through the wireless network the interface device transmits the stored document image. The inventive method includes the steps of communicating with a fax over by means of one protocol to receive a document image, storing the document image, and transmitting the document image by means of a second protocol.

9 Claims, 3 Drawing Sheets

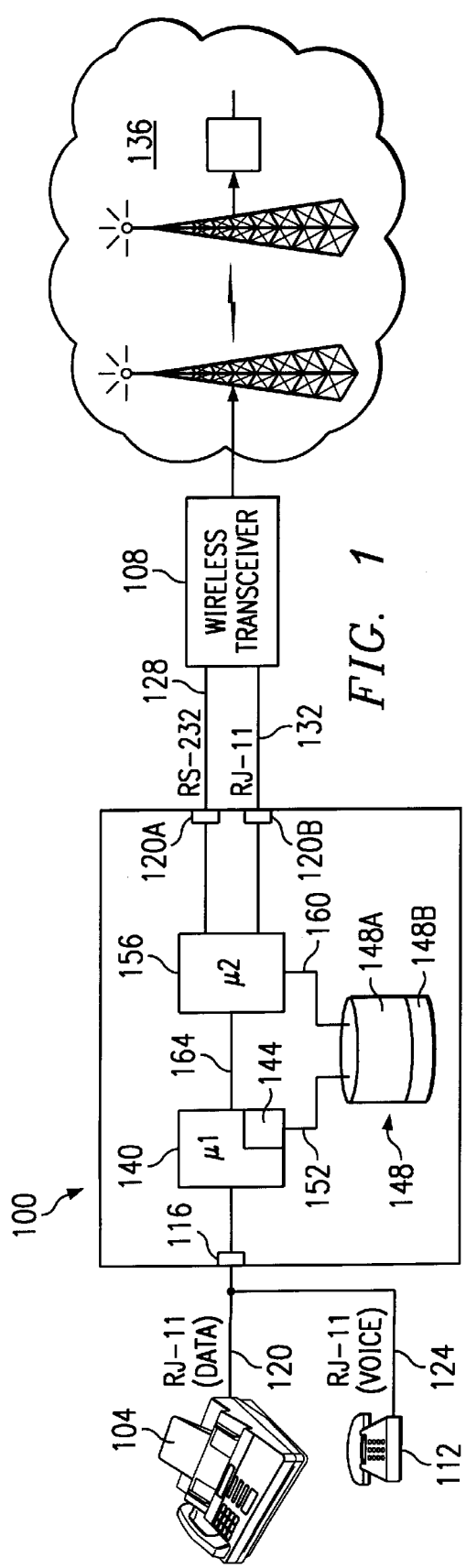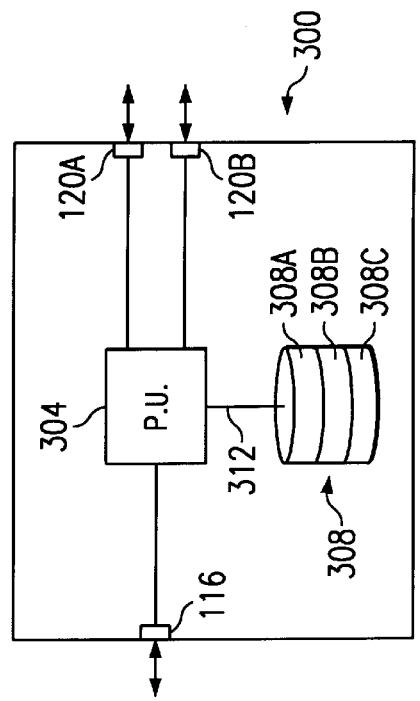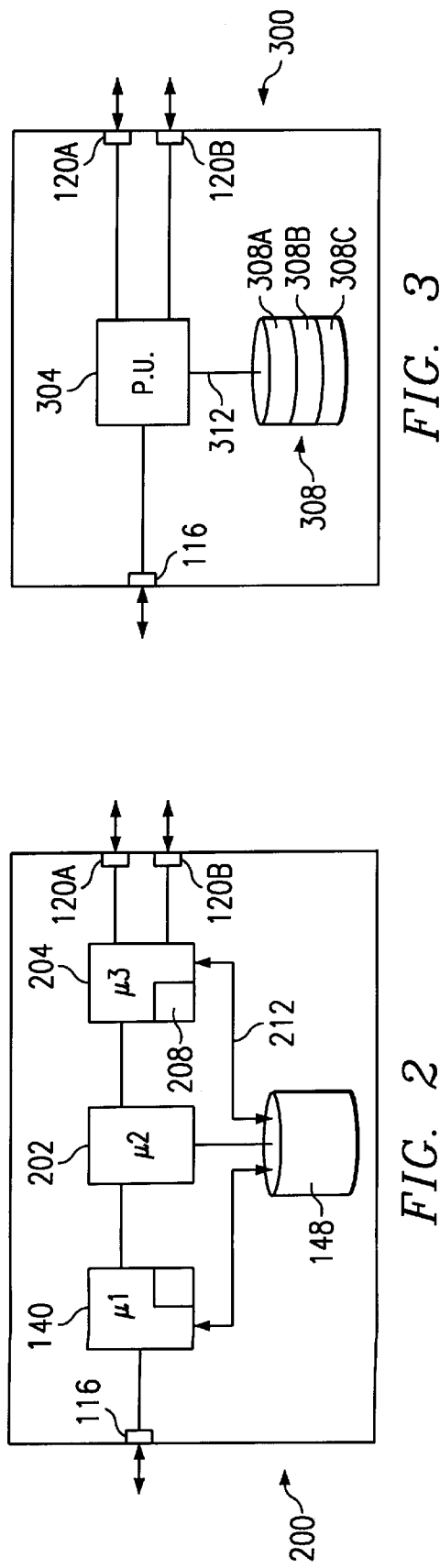

METHOD OF AND APPARATUS FOR PROVIDING AN INTERFACE BETWEEN AN ANALOG FACSIMILE DEVICE AND A WIRELESS NETWORK

CROSS-REFERENCE TO RELATED APPLICATION

The present application claims the benefit of U.S. Provisional Application No. 60/049,846, filed Jun. 17, 1997, titled ANALOG FACSIMILE TRANSLATOR FOR DIGITAL WIRELESS SYSTEMS.

BACKGROUND OF THE INVENTION

1. Field of the Invention

This invention relates to interface systems and more particularly to interface systems for coupling a facsimile device to a fixed wireless access type of network.

2. Description of Related Art

Radio communication devices are often being used along with or in replacement of conventional wireline telephone systems. These radio communication devices provide many advantages over wireline systems. One advantage relates to the supporting infrastructure. Radio communication systems are simpler and less expensive to deploy in comparison to conventional wireline systems. Additionally, radio communication systems often have lower maintenance costs. Finally, radio communication systems are economically feasible in those sparse areas where low demand for communication services does not justify the cost of installing a wireline network.

In a fixed wireless access system (FWA), base stations form an interface between conventional wireline networks and wireless subscriber units. A subscriber unit is a user device which contains a radio transceiver for communicating with a base station. Subscriber units are often made to be compatible with ordinary wireline telephones. Typically, an ordinary telephone is plugged into the subscriber unit through a standard telephone connector such as an RJ-11 jack in place of being connected to the public switched telephone network. For conventional telephones, such a subscriber unit allows an individual to use the ordinary wireline telephone in conjunction with the subscriber unit to place or receive a call. Unfortunately, facsimile (fax) machines do not work well when merely connected to a subscriber unit or wireless transceiver.

Fax machines posses an interface that uses analog modem tones (compliant with ITU Recommendations V.17 or V.29) and are designed to allow the fax machine to communicate over the public switched telephone network (PSTN). The messaging protocol used to exchange documents follows the standards set ITU-T Recommendation T.30 "Procedures for Document Facsimile Transmission in the General Switched Telephone Network". Collectively, the fax machines following these provisions are known as Group III (G3) Fax. These G3 fax machines are referred to herein as analog fax machines in contrast fax machines or computers which emulate fax machines which communicate over a digital medium. For example, one common digital messaging format is known as Class 2.0. In particular, data devices such as laptop and desktop personal computers often implement Class 2.0 messaging formats for the communications through wireless transceivers. There are, however, no systems or device which allow common analog fax machines to transmit in a time division multiple access (TDMA) or code division multiple access (CDMA) transmission medium. There are several technical reasons.

Current wireless transceivers are not compatible with the various analog fax protocols. For example, even if a wireless transmitter is capable of establishing a link with a fax machine, the fax machine is not designed to wait until a wireless communication link is established by the transceiver. Accordingly, the fax machine's internal logic will typically cause it to time out and drop the call while the transceiver attempts to establish a wireless communication link. For obvious reasons, this situation is unacceptable. What is needed, therefore, is an interface device capable of communicating with a fax machine and with a wireless transceiver in a manner which avoids the loss of data or the dropping of a call.

SUMMARY OF THE INVENTION

One reason that fax interface devices have not been developed for wireless transmissions is that facsimile protocols include certain sequences of events which are not readily compatible with common wireless protocols. For example, analog fax machines require the acknowledgment of a dial tone prior to the initiation of a fax transaction. Moreover, the signals which are transmitted initially are transmitted in the form of DTMF tones for sending the dialed digits. After a call is connected and a line is established between the fax machine and the receiving system (fax or fax emulator), the fax protocol continues and eventually the fax data is transmitted. Additionally, fax protocols include time constraints which are not sufficient for establishing a communication link over a wireless network.

Accordingly, an interface device includes a processing unit for emulating PSTN functions for establishing a communication link with a fax machine and for transmitting and receiving signals according to a plurality of different protocols and memory to store a document image. The interface device is an independent device which is compatible with common fax machines as well as with CDMA and TDMA wireless transceivers. In general, the interface device receives and sends fax documents at one interface port using the T.30 protocol and transmits and receives Class 2.0 AT commands and digital signals which conform to IS-99 and IS-135 digital fax standards at another interface port. Accordingly, no new protocols or fax compatible CDMA and TDMA wireless transceivers need to be developed.

In operation, the inventive method generally includes creating a communication link with an analog fax machine connected to a first part of the interface device by emulating a PSTN connection as well as the T.30 protocol for analog fax machines. This includes simulating a dial tone as well as other tones and exchanging T.30 messages which serve to prompt the analog fax machine to complete the connection and to transmit fax data. The method further includes receiving the fax data, which represents a document image, and storing the data. In one embodiment of the invention signals are sent to a wireless transceiver connected to a second port of the interface device in one of a plurality of digital fax protocols to initiate a wireless communication link after the communication with the fax machine is complete. In a second embodiment of the invention, signals are sent to the wireless transceiver connected to the second port of the interface device to initiate a wireless communication link after at least one page of a document image has been received but before transmission of the entire document is completed by the analog fax machine connected to the first port. In this embodiment, the analog fax machine communicates over the first and second ports simultaneously.

Once a wireless communication link is established according to a select wireless communication protocol (for example, GSM, TDMA and CDMA) and a signal is received from the wireless transceiver indicating the same, digital fax data is transmitted to the wireless transceiver for transmission to a receiving transceiver. As a part of completing the wireless communication link, the receiving wireless transceiver must create a communication link to the final destination. Accordingly, if the final destination is a fax machine or a computer emulating a fax machine, a communication line must be established with it. When the fax machine is ready to accept data, the receiving wireless transceiver informs the transmitting transceiver of the same. Accordingly, once the transmitting transceiver informs the interface device that a link has been established and that a receiving fax machine is ready to receive data, the interface device begins data transmission. Known protocols are used by the interface device, the wireless transceivers and the receiving fax machine to complete the communication link to initiate the data transfer. Accordingly, no specialized equipment is necessary other than the interface device disclosed herein in order to send faxes from an analog fax machine over a wireless network. Additionally, because the interface device communicates with he fax machine on one port and with a wireless transceiver over a second port, it is also capable of receiving faxes from the wireless transceiver storing the document image and then initiating communication with the analog fax to deliver the document. In this embodiment, the inventive method includes transmitting a ring to the analog fax machine to prompt it to respond to receive the call and the fax document.

BRIEF DESCRIPTION OF THE DRAWINGS

FIG. 1 is a functional block diagram of a communications network which includes a preferred embodiment of an interface device;

FIG. 2 is a functional block diagram of an alternate embodiment of an analog to digital fax converter;

FIG. 3 is a functional block diagram of a second alternate embodiment of an analog to digital fax converter;

DETAILED DESCRIPTION OF THE EXEMPLARY EMBODIMENTS OF THE PRESENT INVENTION

Figure 4:
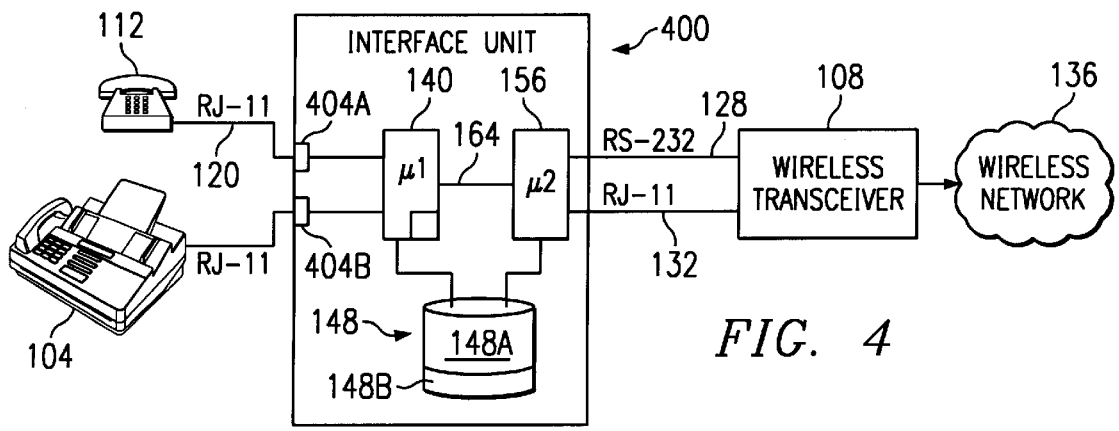
FIG. 4 is functional block diagram of a wireless network which includes a second preferred embodiment of an analog to digital fax converter.

FIG. 1 is a functional block diagram of a communications network which includes a preferred embodiment of an interface device. Referring now to FIG. 1, an analog to digital fax converter (ADFC) 100 is connected between a facsimile device (FAX) 104 and a wireless transceiver 108. Additionally, the ADFC 100 is connected to a wireline telephone 112. As may be seen, the fax 104 and the telephone 112 are commonly connected to port 116. The wireless transceiver 108 is connected to ADFC 100 through ports 120A and 120B. For the preferred embodiment, as shown in FIG. 1, port 120A is an RS-232 serial digital data port for transmitting data while port 120B consists of a phone jack, by way of example, an RJ-11 phone jack for carrying analog voice signals.

Continuing to refer to FIG. 1, the fax 104 is connected to port 116 by line 120. Line 120 is, in the preferred embodiment, a phone line suitable for an RJ-11 jack. Similarly, the telephone 112 is connected to the port 116 by a line 124. The Line 124 also appropriate for an RJ-11 jack and which is used in the system of FIG. 1 to carry voice signals from and to telephone 112.

The ADFC 100 is connected to wireless transceiver 108 by line 128 through port 120A and by line 132 through port 120B. Because port 120A is in the preferred embodiment, an RS-232 port, line 128 must be suitable for carrying RS232 transmissions. Similarly, line 128 must be appropriate for connecting to the RJ-11 jack of port 120B for the transmission of voice signals.

Continuing to refer to the network of FIG. 1, the ADFC 100 includes a processor 140 which is connected to receive and transmit signals through port 116. Processor 140 includes a store 144 which is used to store information, and more specifically protocol information, for communications through port 116. For example, store 144 may be formed of read only memory internal to processor 140 which defines the various tones which are used by telephony devices in common public switched telephone networks (PSTNs). Such tones are typically used to prompt external devices such as fax machines or switches to respond in specified manners.

Processor 140 is connected to store 148 which includes register areas 148A and 148B. As may be seen, processor 140 is connected to store 148 by line 152. Register area 148A is for storing a document image. Register area 148B is for storing protocol information used by the ADFC 100 in communicating with wireless transceiver 108. The store 148 also is connected to a processor 156 by line 160. Processor 156 communicates with the store 148 over line 160 for storing and reading document images as well as for obtaining protocol information for communications with wireless transceiver 108. Processor 156 is also connected to processor 140 by line 164. Line 164 is used, in part, for the exchange of control and hand off information between processors 140 and 156. Finally, as may be seen, processor 156 is connected to transmit and receive signals through ports 120A and 120B.

In operation, the ADFC 100 of FIG. 1 is operable to receive and transmit fax documents through ports 116 and 120A. Similarly, the ADFC 100 is operable to receive and transmit voice signals through ports 116 and 120B. In general, the ADFC 100 merely passes a voice signal received at port 116 through to port 120B and vice versa. In contrast, received document images in the form of fax data are stored in register area 148A, regardless of whether the document image is received at port 116 or port 120A. Thereafter, the ADFC 100 transmits the stored document image through the other of ports 116 and 120A. In general, a document image is received on one port, stored and then transmitted through the other port. Thus, a document image received from the fax 104 is stored in store 148 and then transmitted to wireless transceiver 108. Similarly, a fax document received from wireless transceiver 108 is stored in store 148 and then transmitted to the fax 104.

The processor 140 uses T.30 protocol information stored in store 144 for interpreting data signals received at port 116 and for generating various PSTN signals which are transmitted from port 116. These various protocols relate to the setup and completion of a call with an external fax such as G3 fax 104. Similarly, the processor 156 uses IS-99/IS-135 protocol information (Class 2.0) stored in register area 148B for interpreting and generating control and data signals through port 120A. Class 2.0 protocol information is the Electronics Industry Association and the Telecommunications Industry Association (EIA/TIA-592) protocol standards. Additionally, processors 140 and 156 exchange control signals over line 164 to and from the other processor that a document image has been stored in store 148 and is ready for delivery to an external source. Signaling information, such as the called party number, is also exchanged by the processors 140 and 156 over line 164.

FIG. 2 is a functional block diagram of an alternate embodiment of an analog to digital fax converter. Referring now to FIG. 2, the ADFC 200 includes a first processor 140, a second processor 202 and a third processor 204. The processor 204 includes a store 208. In this alternate embodiment of the invention, the processor 204 is similar in structure to the processor 140 and includes a read only memory 208 for storing protocol information for use in communications with an external wireless transceiver 108 through ports 120A and 120B. In general, the functionality which previously existed in the processor 156 of the ADFC 100 is now distributed between the processors 202 and 204. Accordingly, the processor 202 performs system control while the processors 140 and 204 are used for the transceiving of signals through the external input/output ports 116, 120A and 120B. The processor 204 stores and receives document images from store 148 over line 212.

FIG. 3 is a functional block diagram of a second alternate embodiment of an analog to digital fax converter. Referring now to FIG. 3, an ADFC 300 includes a processor 304 which is connected to ports 116, 120A and 120B. The processor 304 also is connected to the store 308 by line 312. The store 308 includes a register area 308A, a register area 308B, and a register area 308C. Register area 308A is for storing a document image. Register area 308B is for storing protocol information for communications over port 116. The register area 308C is for storing protocol information for communications over ports 120A and 120B. In general, the protocol information stored in the register area 308B is similar to that stored in the store 144 of FIG. 1 and the store 208 of FIG. 2. As may be seen, the functionality of processors 140, 202 and 204 have been combined and are largely performed by the processor 304. Accordingly, the processor 304 uses protocol information stored in the register area 308B for receiving and placing calls through port 116. Similarly, the processing unit 304 uses the protocol information stored in the register area 308C for communications through ports 120A and 120B. As before, in operation, the processor 304 will receive a fax document image through port 116 and will store the same in the register area 308A. Thereafter, the processing unit 304 will extract the document image from the register area 308A and will transmit the same over port 120A. Likewise, the processing unit 304 will receive a fax document image from port 120A and will store the same in the register area 308A prior to transmitting the faxed document image through port 116 to an external fax 104 (not shown herein).

FIG. 4 is functional block diagram of a wireless network which includes a second preferred embodiment of an analog to digital fax converter. Referring now to FIG. 4, an ADFC 400 is connected to a telephone 112 by line 120 through the port 404A. Port 404A is a port formed of a telephone jack such as an RJ-11, and is similar to port 116. The ADFC 400 is also connected to a fax 104 through port 404B. Port 404B, similar to port 404A, is formed of a telephone jack and is connected to the fax 104 by line 408. In structure, the ADFC 400 is similar to the ADFC 100 shown in FIG. 1. Namely, it includes a processor 140, a processor 156 and a store 148 which includes register areas 148A and 148B. Similar to the ADFC 100, the processors 140 and 156 of the ADFC 400 exchange control information over line 164. One difference between the ADFC 400 and the ADFC 100, however, is that the processor 140 communicates with the telephone 112 and the fax 104 through separate ports rather than through a single port. As will be discussed herein this application, having different ports affects the operation of the ADFC 100 and the ADFC 400. As before, the ADFC 400 is connected to a wireless transceiver 108 by a line 128 and a line 132. As before, lines 128 and 132 support the RS-232 and RJ-11 ports, respectively. Wireless transceiver 108 communicates through wireless network 136. In general, the ADFC 400 operates in a manner similar to the ADFC 100, ADFC 200, and ADFC 300. Each ADFC receives a fax document by means of first protocol over a first port, stores the document image, and then transmits the document image through a second port by means of a second protocol.

Figure 5:
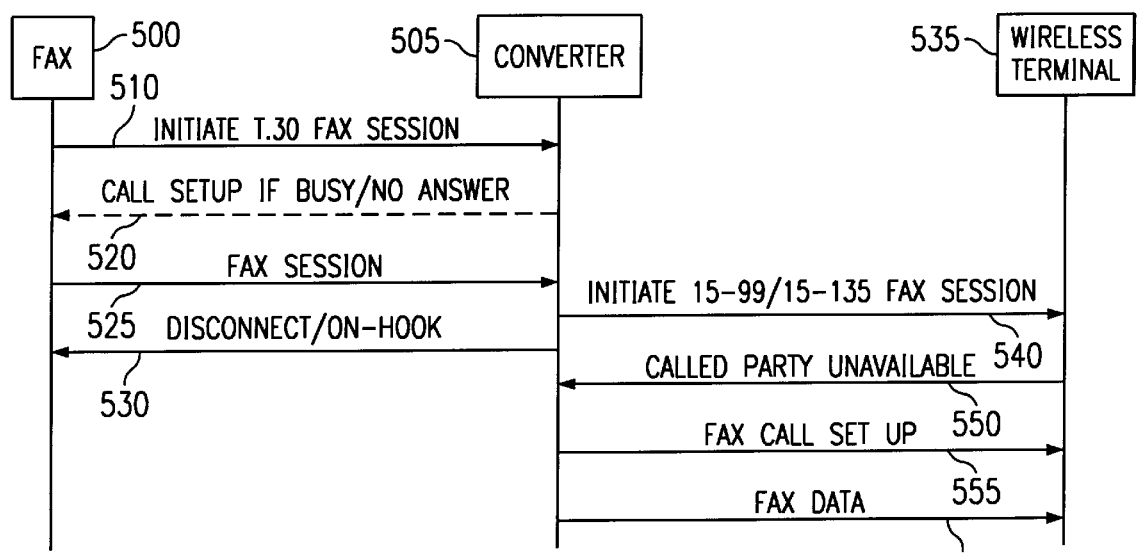
FIG. 5 is a sequence flow diagram which illustrates a method for faxing a document over a wireless network according to a preferred embodiment of the invention.

FIG. 5 is a sequence flow diagram which illustrates a method for faxing a document over a wireless network according to a preferred embodiment of the invention. Referring now to FIG. 5, a facsimile device 500 communicates with a converter (interface device) 505 to setup a call (step 510). Once the call is setup between the fax 500 and the converter 505, the fax 500 transmits a document image to converter 505 by exchanging messages and data following analog fax protocols (as specified in ITU T.30) (step 525). Typically, this fax data comprises a document image. This document image may comprise the entire document or just a part of the document (e.g., the first page). After the fax data transmission is complete, the call is terminated (step 530). Terminating the call includes disconnecting any reserved lines, and transmitting, from converter 505 to fax 500, a signal indicating "on-hook". The "on-hook" signal represents that converter 505 is, with respect to the foregoing call, now off line.

After converter 505 receives a signal from fax 500 indicating that all fax data has been transmitted, converter 505 transmits signals to wireless terminal 535 to establish a call through it. In other words, converter 505 sets up a call with wireless terminal 535 (step 540). While not shown explicitly herein, it is understood that wireless terminal 535 creates a wireless communication link with the wireless network in response to the fax call setup signals received in step 540. Once the fax call setup is complete and a communication link has been setup through the wireless network with a receiving fax device, fax data is transmitted from converter 505 to wireless terminal 535 (step 545). This fax data transmitted in step 545 corresponds to the fax data which converter 505 received from fax 500.

If, on the other hand, wireless terminal 535 is not able to setup a call, it transmits a signal indicating the same to converter 505 (step 550). For example, if a called party telephone is busy as indicated by the receiving wireless transceiver, then wireless terminal 535 transmits a signal to converter 505 in step 550 indicative of the same. A period of time after converter 505 receives the called party unavailable signal from wireless terminal 535 it attempts again to setup a fax call (step 555). Once the fax call is setup, the fax data is transmitted (step 545). As may be seen, therefore, the inventive method illustrated in FIG. 5 includes establishing a communication link with a first fax machine using a first communication protocol, receiving fax data, storing the faxed data, setting up a second communication link using a second communication protocol, and transmitting the faxed data.

Figure 6:
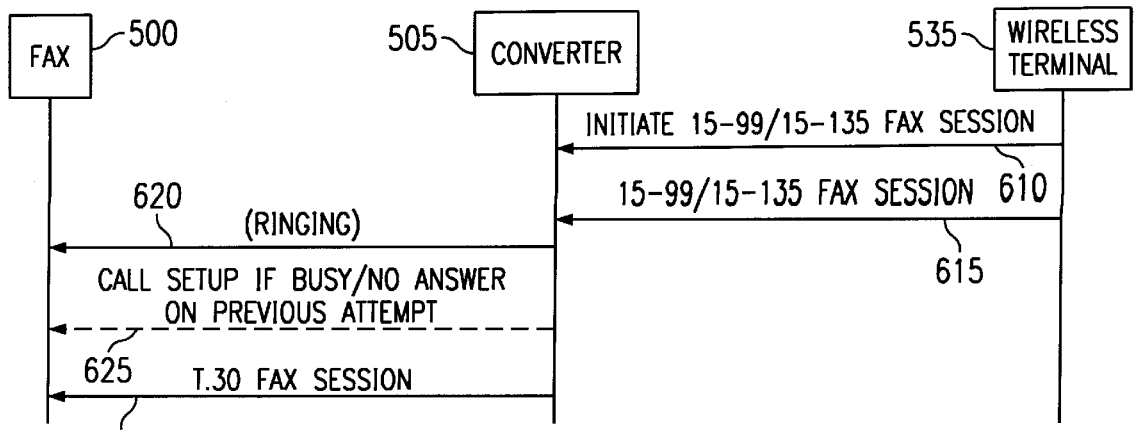
FIG. 6 is a sequence flow diagram which illustrates a second method of faxing a document over a wireless network according to a preferred embodiment of the invention.

FIG. 6 is a sequence flow diagram which illustrates a second method of faxing a document over a wireless network according to a preferred embodiment of the invention. Referring now to FIG. 6, the wireless terminal 535 attempts to setup a call with converter 505 by transmitting a fax call setup signal (step 610). After a fax call is successfully setup, fax data is transmitted from wireless terminal 535 to converter 505 (step 615). Once converter 505 has received a signal indicating that all fax data has been transmitted, it sets up the call with fax 500 (step 620). As before, if the call setup is unsuccessful because, by way of example, fax 500 is either busy or does not answer, then the call setup procedures are repeated (step 625). Once a call is successfully setup between converter 505 and fax 500, converter 505 transmits a document image to fax 500 by exchanging messages and data following analog fax protocols (step 630). As before, the inventive method includes communicating with a wireless terminal by means of a first protocol, receiving fax data, storing the fax data, setting up a call with a fax machine by means of a second protocol, and faxing the stored fax data thereto.

Figure 7:
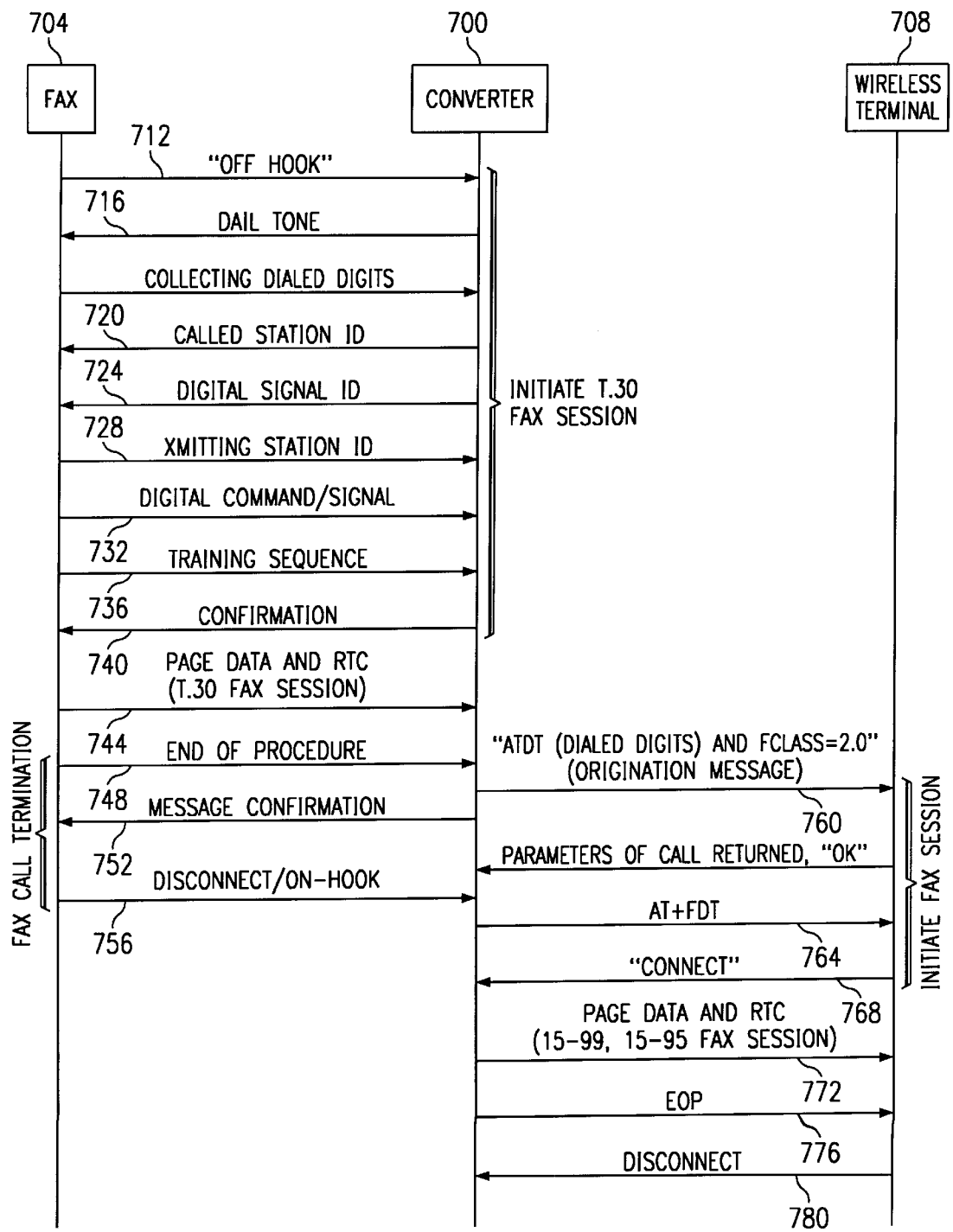
FIG. 7 is a sequence flow diagram which illustrates a method for transmitting the faxed document over a wireless network according to a second preferred embodiment of the invention.

FIG. 7 is a sequence flow diagram which illustrates a method for transmitting the faxed document over a wireless network according to a second preferred embodiment of the invention. Referring now to FIG. 7, a converter 700 (interface device) communicates with a fax 704 and a wireless terminal 708 to transmit a fax document over a wireless network. More specifically, the sequence diagram of FIG. 7 illustrates the method for transmitting a fax through a wireless network, which fax originated from a fax machine that is not connected to the public switch telephone network. As may be seen, the method is initiated when fax 704 transmits a signal to converter 700, which signal reflects "off-hook" (step 712) according to T.30 fax session protocol. The "off-hook" signal is one which fax machines typically produce to emulate the telephony signals which occur when a conventional wireline telephone is taken off hook. As is known by those skilled in the art, fax machines emulate certain wireline telephony functionalities to route a call through the PSTN. Accordingly, because such emulations are typically embedded in the firmware of a fax machine, the inventive interface device also is adapted to emulate PSTN DTMF digit collection to communicate with the fax machine 704. After receiving the "off-hook" signal from fax 704, converter 700 generates a dial tone to fax 704 (step 716). Thereafter, fax 704 transmits a plurality of dialed digits in the form of DTMF tones. In response, converter 700 also generates a call station ID (CSI) (step 720). The purpose of generating a call station ID is to identify the called fax machine (usually the directory number is sent and the calling fax machine displays it). The CSI is the beginning of the analog fax protocol following T.30. Converter 700 also generates a digital signal ID (step 724). In response thereto, fax 704 transmits a station ID (step 728), a digital command signal (DCS) (step 732) and a training sequence (step 736). Thereafter, converter 700 transmits a confirmation signal to fax 704 (step 740). At this point, the initiation of the T.30 fax session is complete. Accordingly, fax 704 transmits a document image followed by an Return to Command (RTC) (step 744). After the fax transmission is complete, fax call termination takes place. Fax call termination includes the transmission of a signal indicating the end of the procedure (step 748), a response thereto from converter 700 which confirms the end of procedure signal (step 752), and a signal from fax 704 to converter 700 indicating that it has disconnected or is "on-hook" (step 756).

When converter 700 receives fax data from fax 704, it stores the data in an internal store. By way of example, store 148 of FIGS. 1 and 2 stores fax data. In a first preferred embodiment of the invention, converter 700 does not attempt to transmit or initiate transmit processes of the document image until it has been completely received document image from fax 704. Accordingly, converter 700 does not attempt to initiate procedures to transmit the document image until the RTC signal is received from fax 704 in step 744. In a second preferred embodiment, converter 700 initiates procedures to transmit the document over a second port while the document is being received over a first port converted to the analog fax machine. In the embodiment, procedures to initiate transmission begin at a point in time after document image transfer has begun from the analog fax machine.

Thus, sometime after the RTC signal is received in step 744, converter 700 transmits an origination message to wireless terminal 708 (step 760). For example, the origination message might include an "ATDT" (dialed digits), and an FCLASS=2.0" signal as is commonly known to those skilled in the art. The wireless terminal then responds by returning the parameters of the call followed by "OK" (step 762). Thereafter, converter 700 transmits an "AT+FDTS" signal to wireless terminal 708 (step 764). Sometime after wireless terminal 708 receives the origination message in step 760 from converter 700, it initiates procedures to establish a call connection through a receiving wireless terminal to a final destination. Once the call is connected to the final destination point, wireless terminal 708 transmits a "CONNECT", "OK" signal to converter 700 (step 768). Once converter 700 receives the "CONNECT", "OK" signal, it transmits the document image and an RTC signal to wireless terminal 708 (step 772). The preceding messages and image data typically constitute an IS-99, IS-95 or IS-135 fax session. Once the transmission of the fax page data is complete, an end of procedure is signal is transmitted by converter 700 to wireless terminal 708 (step 776). Thereafter, the call is disconnected. Wireless terminal 708 indicates the same to converter 700 by transmitting a disconnect signal (step 780).

As is clearly seen, the present invention is significant in the field of fixed wireless access networks. The present invention is believed to be especially effective when configured and employed as described herein, however, those skilled in the art will readily recognize that numerous variations and substitutions may be made in the invention and its use and configuration to achieve substantially the same results as achieved by the embodiments and, in particular, the preferred embodiment described herein. For example, the interface device described herein may be implemented as described as a stand alone device. Alternatively, it may be implemented either as a part of an analog fax machine or a wireless transceiver. Each variation is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. A method for receiving and transmitting a document image in an interface device, comprising the steps of:

determining that a fax machine has transmitted a signal indicating that it has gone "off hook";

transmitting a tone to the fax machine, which tone emulates a dial tone;

receiving DTMF tones from the fax machine temporarily storing these dialed digits, which DTMF tones include calling information;

transmitting a called station ID to the fax machine;

receiving a station ID;

receiving a digital command signal from the fax machine;

receiving a training sequence signal from the fax machine;

transmitting a first confirmation signal to the fax machine;

receiving dialed digits;

temporarily storing the dialed digits;

receiving fax data in the form of a document image;

receiving a signal indicative that all fax data has been transmitted by the fax machine;

transmitting to the fax machine a second confirmation signal;

receiving a disconnect signal;

receiving an "on-hook" signal;

transmitting a dial string message including the temporarily stored dialed digits in an origination message to a wireless transceiver requesting Fax Class 2.0;

transmitting an "AT+FDT" signal to the wireless transceiver;

receiving a signal indicative of a line connection;

transmitting the stored document image;

transmitting a return to command signal (RTC); and transmitting an EOP signal wherein the wireless transceiver terminates its wireless communication link.

2. An interface circuit for receiving and transmitting signals, comprising:

a first port for communicating analog voice and digital data signals;

a second port for communicating digital data signals;

a third port for communicating analog voice signals;

a data store having two storage areas, wherein a first storage area is for storing document images and a second storage area is for storing protocols for communication with a wireless transceiver; and at least two processors, wherein
a first processor, connected to said first port and said data store, includes a storage area to store protocol for communicating said digital data signals over said first port;
a second processor, connected to said second port, said third port, said first processor and said data store, is for communicating with a wireless transceiver via said second port and said third port.

3. The interface circuit of claim 2, wherein said included storage area, for storing protocol for communicating said digital data signals over said first port, includes protocol for communicating with a fax machine.

4. The interface circuit of claim 2, wherein any said analog voice signal received on said first port is passed directly to said third port.

5. The interface circuit of claim 2, wherein any said analog voice signal received on said third port is passed directly to said first port.

6. The interface circuit of claim 2, wherein said first storage area receives and stores document images received from said first port and said second port.

7. The interface circuit of claim 2, wherein said first and second processor exchange signals that indicate a document image has been stored in said first storage area and is ready for delivery.

8. The interface circuit of claim 2, wherein said second processor transmits document images received from said first processor, and stored in said first storage area, to said wireless transceiver via said second port.

9. The interface circuit of claim 2, wherein said first processor transmits document images received from said second processor, and stored in said first storage area, to said fax machine via said first port.

* * * * *